US006879849B2

(12) United States Patent
Begic

(10) Patent No.: US 6,879,849 B2
(45) Date of Patent: Apr. 12, 2005

(54) IN-BUILT ANTENNA FOR MOBILE COMMUNICATION DEVICE

(75) Inventor: Stjepan Begic, Malmö (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 545 days.

(21) Appl. No.: 10/081,013

(22) Filed: Feb. 21, 2002

(65) Prior Publication Data

US 2003/0157903 A1 Aug. 21, 2003

(51) Int. Cl.[7] .................................................. H04M 1/00

(52) U.S. Cl. ................................ 455/575.7; 455/575.1; 455/90.3; 455/558; 343/702

(58) Field of Search .............................. 455/558, 575.1, 455/575.7, 90.1–90.3, 575.5, 550.1, 554.2, 562.1, 128, 129; 343/700 MS, 702, 703, 850, 797, 746, 860

(56) References Cited

U.S. PATENT DOCUMENTS

| | | | | | |
|---|---|---|---|---|---|
| 5,838,285 | A | | 11/1998 | Tya et al. | 343/895 |
| 6,008,774 | A | * | 12/1999 | Wu | 343/700 MS |
| 6,031,494 | A | | 2/2000 | Okabe et al. | 343/702 |
| 6,037,902 | A | | 3/2000 | Pinhas et al. | 343/700 |
| 6,097,934 | A | * | 8/2000 | Spall et al. | 455/575.7 |
| 6,133,886 | A | | 10/2000 | Fariello et al. | 343/702 |
| 6,201,501 | B1 | * | 3/2001 | Arkko et al. | 343/700 MS |
| 6,204,819 | B1 | * | 3/2001 | Hayes et al. | 343/702 |
| 6,266,538 | B1 | * | 7/2001 | Waldron | 343/702 |
| 6,329,960 | B1 | | 12/2001 | Andrew et al. | 343/846 |
| 6,343,208 | B1 | * | 1/2002 | Ying | 455/575.7 |
| 6,348,894 | B1 | * | 2/2002 | Lahti | 343/702 |
| 6,380,895 | B1 | * | 4/2002 | Moren et al. | 343/700 MS |
| 6,408,190 | B1 | * | 6/2002 | Ying | 455/553.1 |
| 6,573,869 | B2 | * | 6/2003 | Moore | 343/702 |

FOREIGN PATENT DOCUMENTS

| | | |
|---|---|---|
| WO | WO 99/03166 | 1/1999 |
| WO | WO 01/05048 | 1/2001 |
| WO | WO 02/37603 A1 | 5/2002 |

OTHER PUBLICATIONS

International Search Report completed Apr. 11, 2003.
European Search Report RS 108394; Dated Oct. 1, 2002.

* cited by examiner

*Primary Examiner*—Lee Nguyen
*Assistant Examiner*—Tuan Tran
(74) *Attorney, Agent, or Firm*—Jenkens & Gilchrist, P.C.

(57) ABSTRACT

An in-built antenna is provided for a mobile phone or other communication device having a main printed circuit board contained within a case, wherein components for transmitting and receiving radio signals are mounted on the main circuit board. An antenna pattern or radiator is etched on the printed circuit board surface mounting the components, in electrical connection with the components, using the same process employed to form the components and connections between them. A ground plane is mounted to the opposing surface of the main printed circuit board, in facing, spaced-apart parallel relationship with the antenna pattern and in spaced-apart parallel relationship with the main printed circuit board.

20 Claims, 3 Drawing Sheets

IN-BUILT ANTENNA FOR MOBILE COMMUNICATION DEVICE

BACKGROUND OF THE INVENTION

The invention disclosed and claimed herein generally pertains to an antenna configuration for a mobile communication device such as a mobile telephone. More particularly, the invention pertains to an in-built antenna, that is, an antenna of the above type which is contained entirely within the case or housing of the communication device. Even more particularly, the invention pertains to an antenna of the above type which reduces cost and communication losses, and is characterized by enhanced manufacturability.

In designing mobile phones, it is frequently desirable to place or enclose the antenna entirely within the interior of the phone case. An arrangement of this type, referred to in the art as an in-built antenna, comprises a radiator or antenna pattern and an antenna ground plane. Typically, the antenna pattern is located above the ground plane, in spaced-apart relationship. The ground plane usually comprises one of the layers of the main printed circuit board of the mobile phone, and the antenna pattern comprises a stamped sheet metal part, or a layer of copper or other conductive material formed upon a flexible printed circuit board. The antenna pattern and its flexible printed circuit board are securely fixed in position with respect to the ground plane and the main printed circuit board, at the required spacing, by means of a plastic carrier.

In the prior art arrangement described above, the spaced-apart antenna pattern is generally connected to radio signal transmit and receive components, located on the main circuit board, by means of a connector having two or more contact pins. This antenna connection is a critical parameter in the operation of the antenna. Accordingly, the antenna pattern connector is usually of a high performance type. However, the need for high performance connectors tends to significantly increase antenna costs. Moreover, the connectors tend to cause losses in transmission and reception of radio signals.

The above disadvantages in conventional in-built antennas are difficult to overcome. An in-built antenna must be capable of being contained within the case or housing of a mobile phone. A mobile phone housing has very limited interior space or volume, and must be able to contain other components in addition to the in-built antenna.

SUMMARY OF THE INVENTION

The present invention provides an in-built antenna which eliminates the conventional antenna connector between the antenna pattern and radio signal transmit and receive components described above. Thus, the costs associated with such connectors, as well as losses between the antenna pattern and the radio transceiver components caused by the connector, are likewise eliminated. Moreover, manufacturability of the antenna, and in particular the manufacture of the radiator or antenna pattern, is significantly enhanced as described hereinafter in further detail.

One embodiment of the invention is directed to an in-built antenna apparatus for a mobile communication device having a case, wherein a main printed circuit board within the case is employed to mount electronic transmit and receive components. The apparatus comprises an antenna pattern formed on a planar surface of the main printed circuit board, a ground plane formed of selected electrically conductive material, and structure for supporting the ground plane within the case, in facing spaced-apart parallel relationship with the antenna pattern. An element of the antenna pattern extends along the planar surface from the antenna pattern to at least one of the signal communication components.

In a preferred embodiment of the invention, the ground plane comprises a flexible printed circuit board connected to the main printed circuit in spaced-apart relationship. Preferably, the ground plane is connected to the surface of the main printed circuit board opposing the board surface on which the antenna pattern is formed.

DETAILED DESCRIPTION OF THE PREFERRED EMBODIMENT

Figure 1:
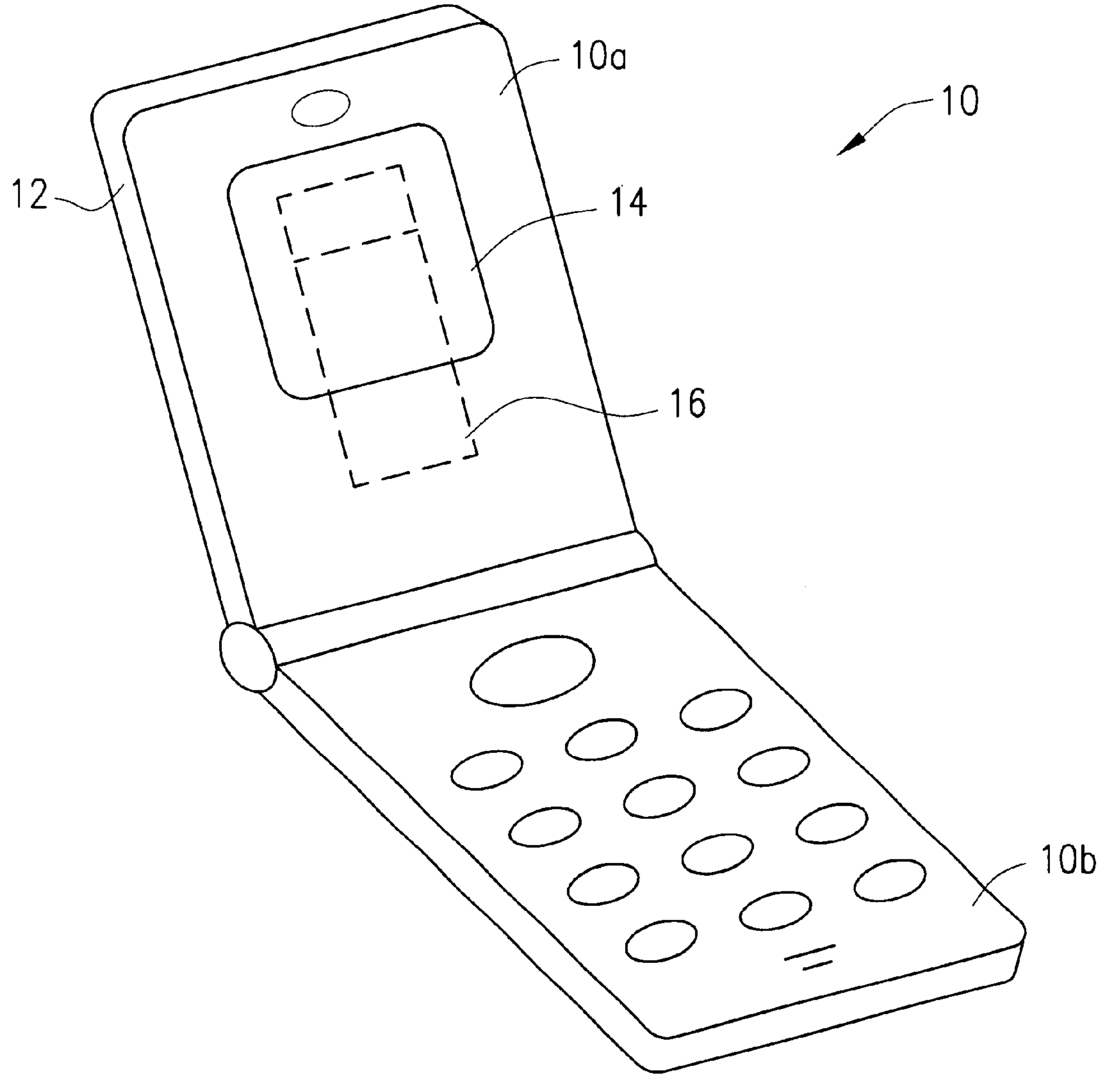
FIG. 1 is a perspective view showing a mobile phone of exemplary type using an embodiment of the invention.

Referring to FIG. 1, there is shown a foldable "clam shell" mobile phone 10 comprising upper and lower phone members 10*a* and 10*b*, respectively. Upper phone member 10*a* is provided with a case or housing 12 for protectively enclosing certain electronic components (not shown). A display window 14 is included in case 12 to enable a phone user to view text or pictorial matter generated by a conventional display device (not shown) located behind window 14.

Referring further to FIG. 1, there is shown a main printed circuit board 16 fixably positioned within upper phone member 10*a* to supportably mount the display behind window 14. Circuit board 16 also supports electronic components (not shown in FIG. 1) required for the transmission and reception of radio signals during operation of mobile phone 10. As described hereinafter, main printed circuit board 16 is also used to mount the antenna required for operation of phone 10, the antenna comprising an in-built antenna contained entirely within case 12.

Figure 2:
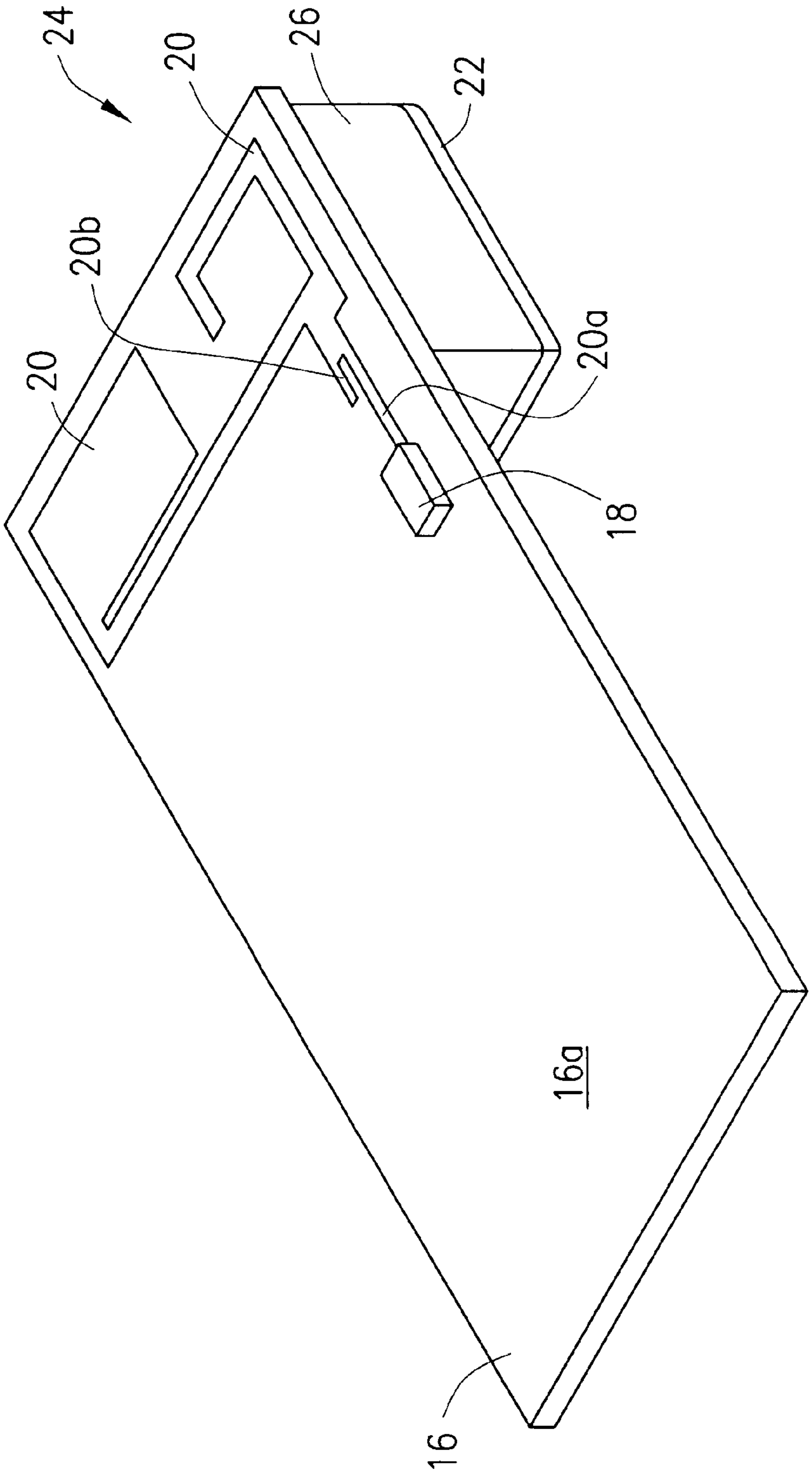
FIG. 2 is a perspective view showing the front side of a main printed circuit board carrying an embodiment of the invention disposed for use in the mobile phone shown in FIG. 1.
Figure 3:
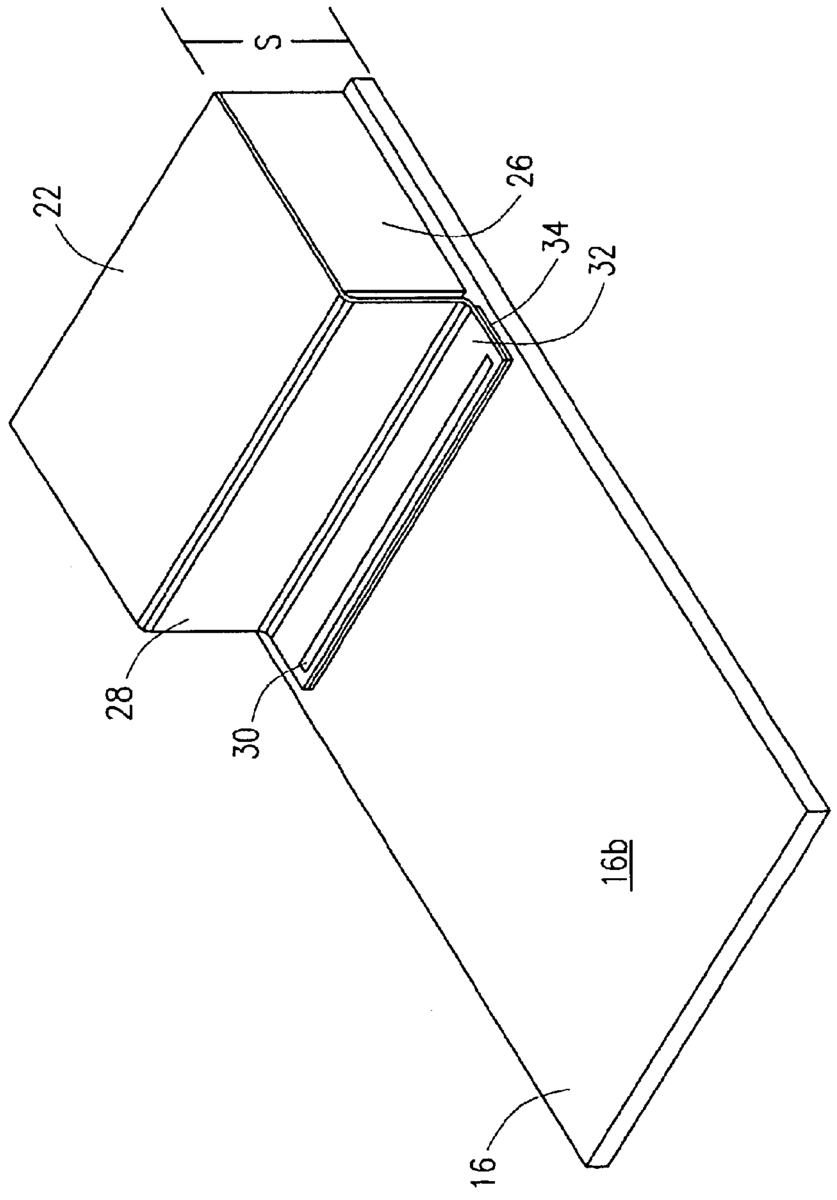
FIG. 3 is a perspective view showing the opposing side of the printed circuit board depicted in FIG. 2.

Referring to FIGS. 2 and 3 together, there is shown main printed circuit board 16 having a front side 16*a* and an opposing rear side 16*b*. Electronic components for transmitting radio signals from mobile phone 10, as well as for receiving radio signals directed thereto, which respectively carry voice and other information, are fixably mounted to side 16*a* of main printed circuit board 16. However, only one of such electrical components, a transmission or receiving component 18, is shown in FIG. 2 for purposes of illustration.

Referring further to FIG. 2, there is shown an in-built antenna component comprising an antenna pattern or radiator 20. Antenna pattern 20 is etched into or printed on main printed circuit board 16 in a pre-specified pattern, in order to provide particular desired antenna characteristics for signal transmission and reception. Preferably, antenna pattern 20 is etched using the same technique employed to fabricate conductive paths between electronic components on circuit board surface 16*a*, and also to fabricate the components themselves, either entirely or in part. Thus, the cost of manufacturing antenna pattern 20 can be substantially reduced. This is achieved by forming the antenna pattern as part of the process of manufacturing conductive paths on circuit board surface 16*a* for respective components, such as component 18.

FIG. 2 further shows an elongated element 20*a* of antenna pattern 20 extended to component 18, to electronically connect antenna pattern 20 to the electronic transmit and receive components on circuit board surface 16*a*. Thus, the arrangement shown in FIG. 2 eliminates the connector pins required in prior art devices of the type described above. Losses in signal transmissions and receptions caused by the use of such connector pins are thereby also eliminated.

Referring to FIG. 3, there is shown a ground plane 22 supported above surface 16*b* of main printed circuit board 16, in facing, spaced-apart parallel relationship with antenna pattern 20. That is, ground plane 22 and antenna pattern 20 respectively lie in planes which are parallel with one another and with surfaces 16*a* and 16*b*. By placing ground plane 22 and antenna pattern 20 in facing relationship with one another, rather than an off-set relationship, a hypothetical axis which is orthogonal to their respective planes and passes through antenna pattern 20 at any point will also pass through ground plane 22. Antenna pattern 20 and ground plane 22 are separated by a spacing s, which is usefully on the order of 8 mm for a conventional mobile phone 10 as shown in FIG. 1. Antenna pattern 20 and ground plane 22, collectively, form the components of an in-built antenna 24 for mobile phone 10, as best shown by FIG. 2. It is to be understood that the scope of the invention is not limited to use with mobile phones of the type shown in FIG. 1, but may be used with a wide range of other mobile communication devices as well.

Referring further to FIG. 3, there is shown ground plane 22 supported upon printed circuit board surface 16*b* and spaced apart therefrom by means of a mounting device 26. In one embodiment mounting device 26 comprises a plastic carrier. Ground plane 22 preferably comprises a flexible printed circuit board, formed of copper or other conductive material. An additional portion 28 of such flexible printed circuit board is bent at 90 degrees to extend downward along the side of mounting device 26, as viewed in FIG. 3, to printed circuit board surface 16*b*. A further portion of the flexible circuit board, comprising a strip or end portion 32, is bent at 90 degrees to portion 28 to abut printed circuit board surface 16*b*. Ground plane 22 is joined to printed circuit board surface 16*b* by attaching end portion 32 thereto, such as by means of heat sealing or hot bar soldering.

Preferably, the mounting device 26 is attached to printed circuit board surface 16*b* by means of snap features or fittings, or by gluing. Portions of ground plane 22 which are adjacent to mounting device 26 are attached thereto by gluing or heat staking.

Alternatively, ground plane 22 may comprise a portion of either a sheet metal part or a plastic part plated with conductive metal. The end portion 32 is then connected to circuit board surface 16*b* by means of soldering or by means of a conductive gasket 34, positioned between surface 16*b* and end portion 32 and held in place by mounting device 26.

Referring further to FIG. 3, there is shown ground plane 22 electrically connected to the main printed circuit board by means of portion 28, portion 32 and a linear microstrip of conductive material 30. Microstrip 30 is in closely spaced relationship, through main printed circuit board 16, with element 20*b* of antenna pattern 20, which defines a boundary of antenna pattern 20 on surface 16*a* of the main printed circuit board. The close spacing between microstrip 30 and antenna pattern element 20*b* is necessary for effective operation of in-built antenna 24.

It is to be emphasized that the antenna pattern shown in the drawings is just one exemplary pattern of many possible configurations, and is not intended to limit the scope of the invention in any way. Many other modifications and variations of the present invention are possible in light of the above teachings. It is therefore to be understood that within the scope of the disclosed concept, the invention may be practiced otherwise than as has been specifically described.

What is claimed is:

1. In a mobile communication device having a case and a main printed circuit board within the case for mounting electronic communication components, antenna apparatus comprising:

an antenna pattern formed of conductive material located on a specified planar surface of said main printed circuit board, an element of said antenna pattern extending to at least one of said communication components to provide a conductive path between said at least one component and said antenna pattern:

a ground plane formed of selected electrically conductive material; and a mounting device for supporting said ground plane within said case in facing spaced-apart parallel relationship with said antenna pattern and in spaced-apart relationship with said main printed circuit board.

2. The apparatus of claim 1 wherein:

said antenna pattern is etched on said specified planar surface of said main printed circuit board.

3. The apparatus of claim 1 wherein:

said ground plane comprises a portion of a flexible sheet of conductive material, and an end portion of said flexible sheet is extended from said ground plane to said main printed circuit board.

4. The apparatus of claim 3 wherein:

said end portion of said flexible sheet joins said ground plane to the surface of said main printed circuit board opposing said specified surface.

5. The apparatus of claim 4 wherein:

said ground plane comprises a flexible printed circuit board.

6. The apparatus of claim 4 wherein:

said end portion is joined to said opposing surface of said main printed circuit board by means of heat sealing.

7. The apparatus of claim 4 wherein:

said end portion is joined to said opposing surface of said main printed circuit board by means of hot bar soldering.

8. The apparatus of claim 4 wherein:

said ground plane comprises a sheet metal part.

9. The apparatus of claim 4 wherein:

said ground plane comprises a metal plated plastic part.

10. The apparatus of claim 4 wherein:

said end portion is joined to said main printed circuit board by means of a conductive gasket.

11. The apparatus of claim 4 wherein:

an element of said antenna pattern defines a boundary thereof, and said ground plane is electrically connected to said main printed circuit by means of a microstrip of conductive material joined to said opposing surface in closely spaced relationship with said element defining said antenna pattern boundary.

12. In a mobile communication device having a case and a main printed circuit board within the case for mounting electronic communication components, a method for configuring an antenna comprising the steps of:

forming an antenna pattern of conductive material on a specified planar surface of said main printed circuit board and extending an element of said pattern to at least one of said communication components; and mounting a ground plane within said case in facing spaced-apart parallel relationship with said antenna pattern and in spaced-apart relationship with said main printed circuit board.

13. The method of claim 12 wherein:

said forming step comprises etching said antenna pattern on said specified planar surface of said main printed circuit board.

14. The method of claim 12 wherein:

said mounting step comprises positioning a mounting device between said ground plane and the surface of said main printed circuit board opposing said specified surface.

15. The method of claim 14 wherein:

said ground plane comprises a portion of a flexible printed circuit board.

16. The method of claim 15 wherein:

an end portion of said flexible circuit board is extended from said ground plane to said opposing surface of said main printed circuit board, and is joined thereto by means of heat sealing.

17. The method of claim 15 wherein:

an end portion of said flexible circuit board is extended from said ground plane to said opposing surface of said main printed circuit board, and is joined thereto by means of hot bar soldering.

18. The method of claim 15 wherein:

an end portion of said flexible circuit board is extended from said ground plane to connect said ground plane to said main printed circuit board by means of a conductive gasket.

19. The method of claim 14 wherein:

said ground plane comprises a sheet metal part.

20. The method of claim 14 wherein:

said ground plane comprises a metal plated plastic part.

* * * * *